April 28, 1970  S. H. SCHER ET AL  3,508,724

HOT AIR BALLOON DECELERATION AND RECOVERY SYSTEM

Original Filed Aug. 31, 1967

INVENTORS
STANLEY H. SCHER
BY JAMES C. DUNAVANT

ATTORNEYS

United States Patent Office 3,508,724
Patented Apr. 28, 1970

3,508,724
HOT AIR BALLOON DECELERATION AND
RECOVERY SYSTEM
Stanley H. Scher, Newport News, and James C. Dunavant, Yorktown, Va., assignors to the United States of America as represented by the Administrator of the National Aeronautics and Space Administration
Continuation of abandoned application Ser. No. 665,682, Aug. 31, 1967. This application Nov. 14, 1968, Ser. No. 775,966
Int. Cl. B64b 1/40, 1/62; B64g 1/00
U.S. Cl. 244—31                                10 Claims

ABSTRACT OF THE DISCLOSURE

A deceleration and recovery system employing a hot air balloon with ram-type openings through which aerodynamically heated atmosphere enters and inflates the balloon during deceleration, thus causing the balloon to become buoyant.

---

This application is a continuation of Ser. No. 665,682, filed Aug. 31, 1967, now abandoned.

The invention described herein was made by employees of the United States Government and may be manufactured and used by or for the Government for governmental purposes without the payment of any royalties thereon or therefor.

This invention relates generally to the field of deceleration and recovery of high speed bodies and more particularly to a system for making such recoveries employing a hot air ballon.

A difficult problem obstructing advancement of space exploration is that of decelerating and recovering equipment shot into space such as rocket boosters and satellites. Most prior art recovery systems have used parachutes to decelerate space equipment and to lower it to impact at a relatively slow speed; however, it has still been necessary to cushion the impact by having it fall into the ocean. One disadvantage of such a system has been that the space equipment must be water-resistant and able to float, and this disadvantage alone has made recovery of booster rockets virtually impossible. Balloon systems have also been suggested for making recoveries. Although it is believed that a balloon could be used both as a drag and as a buoyant device for decelerating and recovering, balloon systems have not been used because of the large quantity of gas, and its attendant weight, that is required to inflate them. Hot air balloons have proven equally as impractical because of the large weight of fuel needed to heat the air.

The significance of this invention was first revealed during a research program with a hot air balloon reentry system. It was though that by using the aerodynamically heated atmosphere, which occurs naturally during high-speed entry into an atmosphere, to inflate the balloon, a weight savings on heater fuel could be made. Surprisingly, experiments disclosed that the system decelerated to zero velocity before impact without using the heater at all. The instant invention embodies this principle of inflating a hot air balloon with aerodynamically heated atmosphere to effect the deceleration and recovery of a high-speed body.

One object of this invention is to provide an improved lightweight system for decelerating and recovering all high-speed bodies.

A further object of this invention is to provide a practical system for rocket booster recovery and reentry from space using a hot air balloon.

Still another object of this invention is to provide a hot air balloon recovery system which utilizes the high kinetic energy of the body being recovered to inflate the balloon with hot atmosphere.

Yet another object of the instant invention is to provide a system for inflating a hot air balloon with aerodynamically heated atmosphere and maintaining this air hot within the balloon.

Another object of the invention is to provide a deceleration and recovery system which floats the body being recovered in the atmosphere so that it might be towed or propelled to the desired landing point.

Further and additional objects of the invention will become obvious from a consideration of this specification, the accompanying drawings and the appended claims.

For a more complete understanding of this invention reference will now be made to the accompanying drawings wherein.

Figure 3:
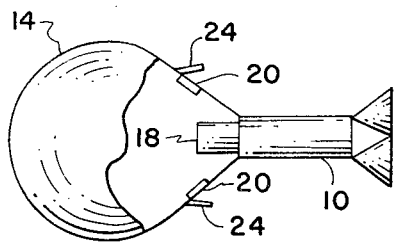
FIG. 3 is a side elevation view of the booster at high altitude with a cutaway view of the attached balloon.
Figure 4:
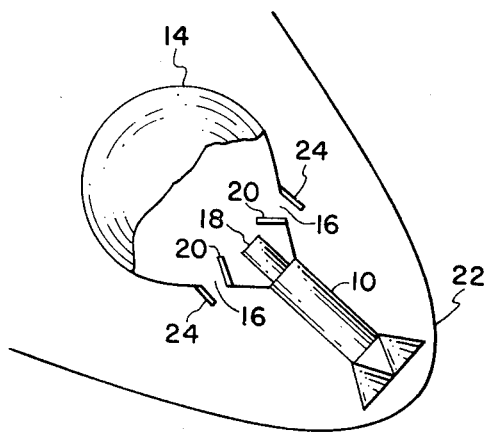
FIG. 4 is a cutaway side elevation view of the booster and attached balloon falling at a high speed through the atmosphere with the associated shock wave being diagrammatically represented.
Figure 2:
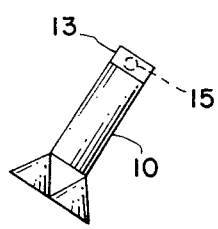
FIG. 2 is a side elevation view of the booster still traveling up from momentum.
Figure 1:
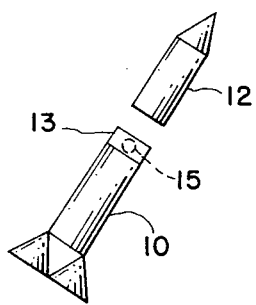
FIG. 1 is a side elevation view of a rocket booster in flight immediately after separation from the upper stage.

Referring now to the drawings wherein like reference numerals designate identical or corresponding parts throughout the several views, and more particularly to FIG. 1, a two-stage space probe is shown in the ascent immediately after the rocket booster 10 has separated from the second stage 12. A folded balloon 13 is in a compartment attached at some convenient position on the booster 10. Also shown in FIGS. 1 and 2, is a small mass of gas 15 inside the balloon which is used to initially inflate the balloon, such as a subliming material. Turning to FIG. 3, the numeral 14 designates an inflated balloon of any suitable shape attached directly to the rocket booster 10; however, it could also be attached thereto by lines. There are several materials available for fabricating the balloon skin, the most likely being metal fabrics or glass fiber cloth. Atlhough either of these materials could understand the required heat and stress, it is anticipated that glass fiber cloth will prove to be more practical because it is cheaper. In FIG. 4, it can be seen that the balloon has a plurality of openings 16 on which valves 20 are installed so that atmosphere flow into and out of the balloon can be regulated. Although only two openings are shown, it is to be understood that they are spaced at intervals about the circumference of the balloon. Valves (of conventional design, which allow flow into the balloon but will not allow flow out of the balloon, unless the internal pressure exceeds external pressure by a predetermined limit, are adequate to carry out the functions essentially to this invention, but more sophisticated valves may be used to give additional vertical control as is hereinafter explained. Scoops 24 are attached to the balloon to channel atmosphere into the openings 16 but the size and shape of such scoops, must be carefully optimized as is hereinafter explained. The openings 16 with associated scoops 24 must be located so that as the system falls through the atmosphere, atmosphere is forced through the openings by a ram action. Numeral 18 designates a heater which is used to provide additional heat to the atmosphere in the balloon, and numeral 22 represents the shock wave which forms in front of the balloon-booster system as it falls through the atmsophere.

Operation

Figure 5:
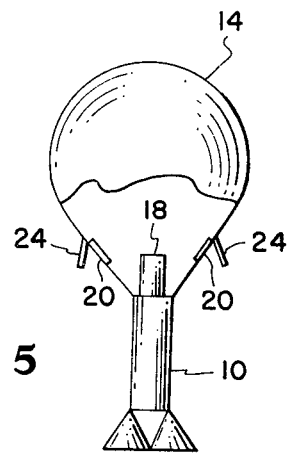
FIG. 5 is a cutaway side elevation view of the booster being suspended in the atmosphere by the balloon which has reached the point of buoyancy.

FIGS. 1–5, when viewed in sequence, show this invention as it is applied to decelerate and recover a rocket booster 10. It is to be understood that the booster 10 is illustrative only of what might be recovered and that the invention has application to decelerate and recover any high speed vehicle. In FIG. 1, a two-stage space probe is shown in the ascent immediately after the rocket booster 10 has separated from the second stage 12. From momentum the booster continues to rise after separation, as shown in FIG. 2, until reaching thin atmosphere at which point the balloon 14 is distended (see FIG. 3), so that the valves 20 become exposed using a small internal mass of gas 15, such as a subliming material. The amount of gas required is very small because the atmosphere is so thin at that altitude. Upon reaching its apogee, the booster and attached balloon begin the descent at an accelerating pace, as shown in FIG. 4, with the balloon creating drag and the whole system giving rise to a shock wave 22 out front. When the outside pressure on valves 20 becomes greater than the internal pressure, they swing open leaving openings 16 through which atmosphere enters the balloon. The gas which was originally used to inflate the balloon does not prevent entry of the atmosphere through the openings because its mass is so small. Increased pressure at the openings 16 can be attained by constructing scoops 24 so as to funnel the atmosphere into the openings; however, they must be carefully designed not to increase the internal pressure of the balloon beyond its bursting point. As can be seen in FIG. 4, the atmosphere which enters the openings 16 must first pass through the shock wave 22 and is thereby heated due to the aerodynamic heating phenomena. This atmosphere is further heated by being compressed within the balloon 14. Because of the drag of the balloon 14 and the buoyancy of the hot atmosphere within the balloon, the system eventually decelerates to zero velocity at which point the booster 10 is suspended in the atmosphere by the fully charged hot air balloon 14, as is shown in FIG. 5. Here, the valves 20 are closed to prevent the escape of hot atmosphere from the openings 16; however, they must be designed to allow relief of internal pressures above a predetermined limit. Eventually the atmosphere in the balloon will cool and the system will again begin its descent until finally impacting. Although it is possible to design the system so that it becomes suspended in the atmosphere at a very low altitude and, therefore, impacts at a low velocity, most likely it will be desirous to prolong the period for which the system is suspended so that it can be propelled to the proper landing area and then brought to impact at a regulated rate. For this purpose, a heater 18 is used to maintain the atmosphere in the balloon at a high temperature; however, the size of the heater 18 and the amount of fuel that it uses can be comparatively small because it does not have to bring the atmosphere up to the high temperature. After the booster is suspended in the atmosphere it is retrieved by some flying device such as a helicopter or it could have a built-in propulsion system such as that on a dirigible. For controlling the rate of descent, the heater 18 and/or the valves 20 can be used singly or in combination, with open valves accelerating descent and increased heat decelerating descent. Additional valves could also be installed at the top of the balloon to provide added vertical control.

In the above embodiment the balloon is distended by a small mass of gas so that the openings 16 and scoops 24 become exposed to the airstream. If the openings and scoops were located close to the booster 10 they could be held exposed to the airstream by arms extending from the booster 10, and then no small mass of gas would be needed.

There are many possible uses for this invention other than the recovery of booster rockets and reentry spacecraft. A space probe entering the atmosphere of a planet could be decelerated and suspended in the atmosphere of the planet for the purpose of photographing the area over which it drifts. It is also possible that this system could be used to recover X15-type aircraft.

What is claimed is:

1. A method of decelerating and suspending in an atmosphere a high velocity body comprising the step of:
   inflating a balloon with hot air generated solely by an attached body having a speed sufficient to heat the surrounding atmosphere by the aerodynamic heating phenomena caused by the relative motion between the atmosphere and said body to a temperature sufficient to render the body floating, whereby said body is decelerated and suspended in the atmosphere.

2. A method of decelerating and suspending in an atmosphere a high velocity body as in claim 1, including the step of maintaining the atmosphere in the balloon hot for sustained buoyancy.

3. A method of decelerating and suspending in an atmosphere a high velocity body as in claim 2 including the steps of cooling the atmosphere in the balloon; and regulating the amount of atmosphere in the balloon to allow landing said body on a hard surface.

4. A system for decelerating and suspending in an atmosphere a high velocity body comprising:
   body means having an initial supersonic velocity;
   a balloon attached to said body and exposed to said supersonic velocity; and
   means for inflating said balloon with the surrounding atmosphere which has been heated solely by the aerodynamic heating phenomena caused by the relative motion between the atmosphere and said body means;
   said body means heating the surrounding atmosphere to a temperature such that its inflation of the balloon and compression in the balloon will cause the body to float whereby the body is decelerated and suspended in the atmosphere.

5. A system for decelerating and suspending in an atmosphere a high velocity body as embodied in claim 4, wherein the means for inflating the balloon with aerodynamically heated atmosphere consists of:
   openings in the balloon; and
   scoop means fixed to said balloon adjacent said openings directing said heated atmosphere into the interior of the balloon.

6. A system for decelerating and suspending in an atmosphere a high velocity body as embodied in claim 5 wherein the openings have attached thereto valves for regulating the flow of atmosphere to and from the balloon.

7. A system for decelerating and suspending in an atmosphere a high velocity body as embodied in claim 5 wherein means for exposing said openings to the airstream prior to beginning deceleration are included.

8. A system for decelerating and suspending in an atmosphere a high velocity body as embodied in claim 7 wherein the means for exposing said openings to the airstream consists of a small internal mass of gas which distends the balloon.

9. A system for decelerating and suspending in an atmosphere a high velocity body as embodied in claim 4 wherein auxiliary means for maintaining the atmosphere within the balloon in its heated state after inflation has been completed are included.

10. A system for decelerating and suspending in an atmosphere a high velocity body as embodied in claim 4 including means for regulating the heat resulting from compression of the heated atmosphere utilized in inflating the balloon.

References Cited

UNITED STATES PATENTS

| 3,131,889 | 5/1964 | Yost. | |
|---|---|---|---|
| 3,168,266 | 2/1965 | Yost. | |
| 3,229,932 | 1/1966 | Yost. | |
| 3,350,040 | 10/1967 | Sims et al. | 244—113 X |

MILTON BUCHLER, Primary Examiner

J. L. FORMAN, Assistant Examiner

U.S. Cl. X.R.

244—1, 138, 113